(12) United States Patent
Hu

(10) Patent No.: US 11,543,071 B2
(45) Date of Patent: Jan. 3, 2023

(54) CONNECTION APPARATUS OF DETACHABLE GIMBAL AND UNMANNED AERIAL VEHICLE

(71) Applicant: AUTEL ROBOTICS CO., LTD., Guangdong (CN)

(72) Inventor: Liangjun Hu, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 724 days.

(21) Appl. No.: 16/454,634

(22) Filed: Jun. 27, 2019

(65) Prior Publication Data

US 2019/0338885 A1 Nov. 7, 2019

Related U.S. Application Data

(63) Continuation of application No. PCT/CN2017/087434, filed on Jun. 7, 2017.

(30) Foreign Application Priority Data

Dec. 23, 2016 (CN) .......................... 201611213295.6

(51) Int. Cl.
*F16M 11/12* (2006.01)
*H01R 13/631* (2006.01)
*H01R 13/639* (2006.01)

(52) U.S. Cl.
CPC ......... *F16M 11/123* (2013.01); *H01R 13/631* (2013.01); *H01R 13/639* (2013.01); *B64C 2201/027* (2013.01); *B64C 2201/123* (2013.01)

(58) Field of Classification Search
CPC .... F16M 11/123; F16M 11/18; F16M 11/041; H01R 13/631; H01R 13/639; B64C 2201/027; B64C 2201/123; B64C 2201/127; B64C 39/024; B64D 47/08
See application file for complete search history.

(56) References Cited

U.S. PATENT DOCUMENTS

2019/0338885 A1* 11/2019 Hu ........................ H01R 13/631
2022/0078389 A1* 3/2022 Jiang ..................... B64D 47/08

FOREIGN PATENT DOCUMENTS

CN 105517903 A * 4/2016 ........... B64C 39/024

* cited by examiner

*Primary Examiner* — Abdullah A Riyami
*Assistant Examiner* — Nader J Alhawamdeh

(57) ABSTRACT

A connection apparatus of a detachable gimbal and an unmanned aerial vehicle are disclosed. The connection apparatus of a detachable gimbal includes: an alignment component, where the alignment component is configured to align a circuit connection terminal of an unmanned aerial vehicle with a circuit connection terminal of a gimbal; a pre-installed component disposed on the alignment component, where the pre-installed component moves relative to the alignment component to fixedly connect the gimbal to a fuselage of the unmanned aerial vehicle; and a locking component disposed on the pre-installed component, where the locking component locks the pre-installed component when the pre-installed component moves relative to the alignment component to a preset location.

17 Claims, 5 Drawing Sheets

US 11,543,071 B2

CONNECTION APPARATUS OF DETACHABLE GIMBAL AND UNMANNED AERIAL VEHICLE

CROSS-REFERENCE TO RELATED APPLICATIONS

The present application is a continuation of International Application No. PCT/CN2017/087434, filed on Jun. 7, 2017, which claims priority of Chinese Application No. 201611213295.6, filed on Dec. 28, 2016, both of which are incorporated herein by reference in their entireties.

BACKGROUND

Technical Field

Implementations of the present application relate to the field of unmanned aerial vehicles and in particular, to a circuit protection apparatus of a detachable gimbal and a corresponding unmanned aerial vehicle.

Related Art

With the development of wireless interconnection and image processing technologies, functions of an unmanned aerial vehicle are stronger and appreciated by more users. To obtain images of the unmanned aerial vehicle, the unmanned aerial vehicle needs to carry a gimbal provided with a camera set. The gimbal and a fuselage of the unmanned aerial vehicle are integrally formed. In more unmanned aerial vehicle designs, the gimbal is detachable from the fuselage of the unmanned aerial vehicle.

Currently, a gimbal fixing apparatus adopted on the unmanned aerial vehicle is generally a triaxial structure that fastens the gimbal and is inconvenient for a user in use and not easy to assemble and disassemble. When the apparatus is usually inserted laterally, circuit connection terminals are easily damaged due to mechanical use, wear and contact between the connection terminals, causing the gimbal to fail in working, or other problems.

Chinese Patent Application No. 201610107361.5 discloses an unmanned aerial vehicle with a detachable gimbal, including a fuselage and a gimbal, where the gimbal is provided with a camera component and the fuselage and the gimbal are detachably connected. The gimbal and the fuselage are installed as follows: A case 102 is provided with a straight slot 112 at a location of a corresponding fixing portion 110. The straight slot 112 forms a segmented sliding rail 106. When the gimbal is being installed, after a sliding block 205 slides to be in place on the sliding rail 106, a clamping apparatus includes a fixture block 206, the case 102 is provided with a groove 109 and the fixture block 206 is matched with the groove 109. The fixture block 206 is clamped in the groove 109 to fix the gimbal on the fuselage. When the clamping apparatus is working, first, the sliding block 205 slides to be in place, the fixture block 206 is embedded into the groove 109, the fixture block 206 is clamped in the groove 109 to clamp one side of the gimbal 201 provided with the fixture block 206 onto the case 102 and then the sliding block 205 on the gimbal 201 is matched with the sliding rail 106 on the case 102, to connect the gimbal 201 to the case 102 (Page 4 of the specification).

However, each time the gimbal is being disassembled and installed, the sliding block 205 needs to slide to be in place in the sliding rail 106 and a circuit connection terminal on the sliding block 205 easily wears during disassembly. This affects transmission of image data of the gimbal, or finally causes the gimbal to fail in working.

Therefore, the existing technology for fixedly connecting the fuselage and the gimbal of the unmanned aerial vehicle needs to be improved and developed.

SUMMARY

The technical problem mainly resolved by implementations of the present application is to provide a circuit protection apparatus of a detachable gimbal, a corresponding detachable gimbal and an unmanned aerial vehicle. When a gimbal using a gimbal connection apparatus is being installed to a fuselage, the electrical connection between the unmanned aerial vehicle and the gimbal can be ensured, circuit connection terminals between the unmanned aerial vehicle and the gimbal are aligned first and the circuit connection terminals are fixed after the alignment, to reduce the mechanical use of the circuit connection terminals and improve the service life of the unmanned aerial vehicle. Moreover, a pre-installed component and a locking component are convenient and easy to operate and the gimbal can be fixed and disassembled by performing a simple rotating operation or a pressing and rotating operation.

To resolve the foregoing technical problem, according to a first aspect, a technical solution provided in an implementation of the present application is:

A connection apparatus of a detachable gimbal is provided and includes:

an alignment component, where the alignment component is configured to align a circuit connection terminal of an unmanned aerial vehicle with a circuit connection terminal of a gimbal;

a pre-installed component disposed on the alignment component, where the pre-installed component moves relative to the alignment component to fixedly connect the gimbal to a fuselage of the unmanned aerial vehicle; and a locking component disposed on the pre-installed component, where the locking component locks the pre-installed component when the pre-installed component moves relative to the alignment component to a preset location.

To resolve the foregoing technical problem, according to a second aspect, another technical solution adopted in an implementation of the present application is:

An unmanned aerial vehicle is provided and includes a fuselage, a circuit connection terminal of the unmanned aerial vehicle, a gimbal and a circuit connection terminal of the gimbal and includes a gimbal connection apparatus for detachably connecting the unmanned aerial vehicle to the gimbal, where the gimbal connection apparatus includes:

an alignment component, where the alignment component is fixed on the gimbal and is configured to align the circuit connection terminal of the unmanned aerial vehicle with the circuit connection terminal of the gimbal;

a pre-installed component disposed on the alignment component, where the pre-installed component moves relative to the alignment component to fixedly connect the gimbal to the fuselage; and a locking component disposed on the pre-installed component, where the locking component locks the pre-installed component when the pre-installed component moves relative to the alignment component to a preset location.

To resolve the foregoing technical problem, according to a third aspect, still another technical solution adopted in an implementation of the present application is:

A detachable gimbal is provided and includes a gimbal connection apparatus configured to detachably connect an unmanned aerial vehicle to a gimbal, where the gimbal connection apparatus includes:

an alignment component, where the alignment component is fixed on the gimbal and is configured to align a circuit connection terminal of the unmanned aerial vehicle with a circuit connection terminal of the gimbal;

a pre-installed component disposed on the alignment component, where the pre-installed component moves relative to the alignment component to fixedly connect the gimbal to a fuselage; and a locking component disposed on the pre-installed component, where the locking component locks the pre-installed component when the pre-installed component moves relative to the alignment component to a preset location.

Beneficial effects of the implementations of the present application are: In the gimbal connection apparatus, the detachable gimbal and the unmanned aerial vehicle provided in the embodiments, an alignment component is disposed to preferentially ensure the electrical connection of circuit connection terminals between the unmanned aerial vehicle and the gimbal, so that the circuit connection terminals between the unmanned aerial vehicle and the gimbal only need to maintain the electrical contact to avoid repeated friction during disassembly, to reduce the mechanical loss of the circuit connection terminals and improve the service life of the unmanned aerial vehicle. Moreover, the pre-installed component and the locking component are convenient and easy to operate and the gimbal can be fixed and disassembled by performing a simple rotating operation or a pressing and rotating operation.

DETAILED DESCRIPTION

To make the objectives, technical solutions and advantages of embodiments of the present application clearer, the following further describes the embodiments of the present application in detail with reference to the accompanying drawings. Herein, the exemplary embodiments of the present application and the descriptions thereof are used to explain the present application, but are not used as limitations on the present application.

The present application relates to a connection apparatus of a detachable gimbal, a corresponding detachable gimbal and an unmanned aerial vehicle.

When a gimbal provided with a gimbal connection apparatus is being detachably installed to a fuselage of the unmanned aerial vehicle, first, the electrical connection between the unmanned aerial vehicle and the gimbal is ensured and an alignment component is disposed to preferentially ensure the electrical connection of circuit connection terminals between the unmanned aerial vehicle and the gimbal. Moreover, working of a pre-installed component and a locking component does not affect the alignment component, to fully reduce the mechanical loss of repeated friction in a process of installing and disassembling the gimbal and improve the service life of the unmanned aerial vehicle. Moreover, the pre-installed component and the locking component disposed in the embodiments of the present application are convenient and easy to operate and the gimbal can be fixed and disassembled by performing a simple rotating operation or a pressing and rotating operation.

Figure 1:
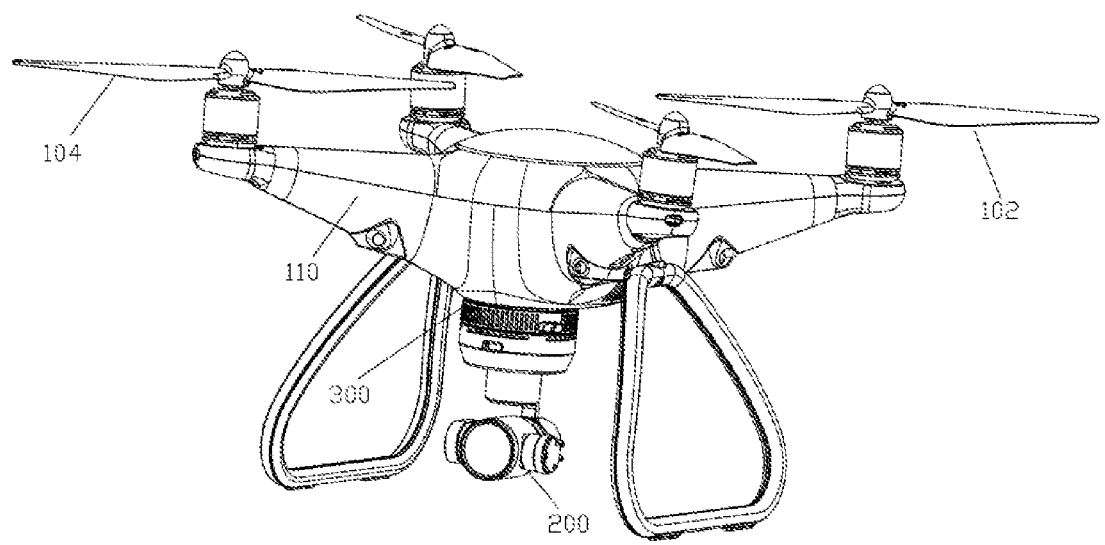
FIG. 1 is a schematic view of a three-dimensional structure of an unmanned aerial vehicle according to an implementation of the present application.

Referring to FIG. 1, a gimbal connection apparatus 300 of the present application is partially inserted, by using a pre-installed component fixed on a gimbal, into a fuselage connection plate fixed on an unmanned aerial vehicle and the pre-installed component is rotated by a certain angle and then locked by a locking component, so that the pre-installed component cannot be rotated and therefore the gimbal 200 is fixed on the unmanned aerial vehicle 100. The pre-installed component and the locking component are convenient and easy to operate and the gimbal can be fixed and disassembled by simply rotating the pre-installed component or pressing the locking component while rotating the pre-installed component. Specifically, when the gimbal is removed, fingers exert a certain force to press the button of the locking component, to rotate a rotating ring of the pre-installed component and then the gimbal 200 may be directly pulled out, so that assembly and disassembly work between the gimbal 200 and the fuselage 110 of the unmanned aerial vehicle can be easily and stably completed without tools and a circuit can be protected and cooled, to ensure normal work of the gimbal and the unmanned aerial vehicle.

Figure 2:
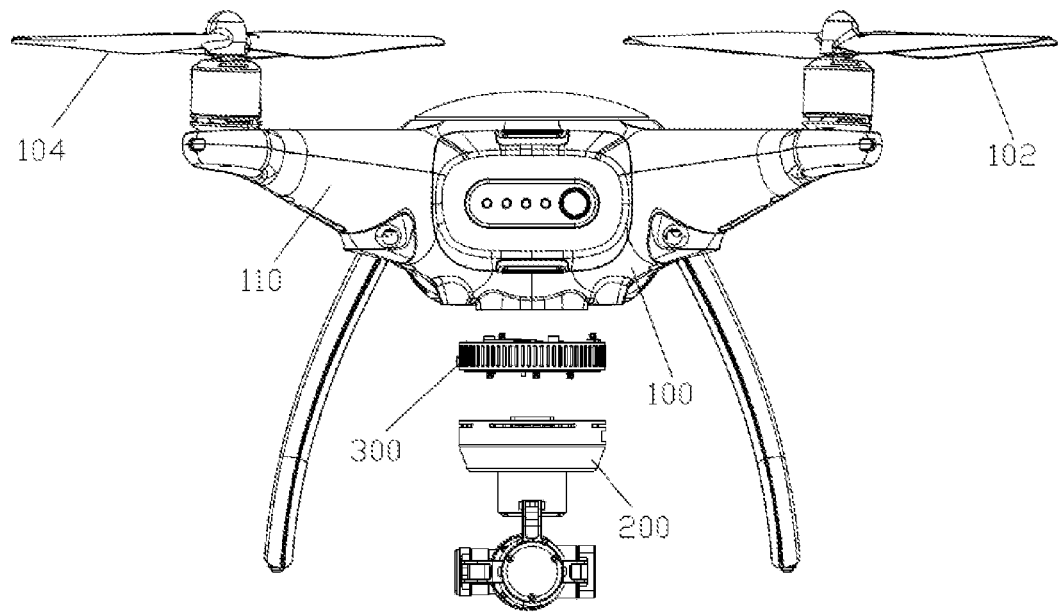
FIG. 2 is a disassembly state view of a gimbal of an unmanned aerial vehicle according to an implementation of the present application.
Figure 3:
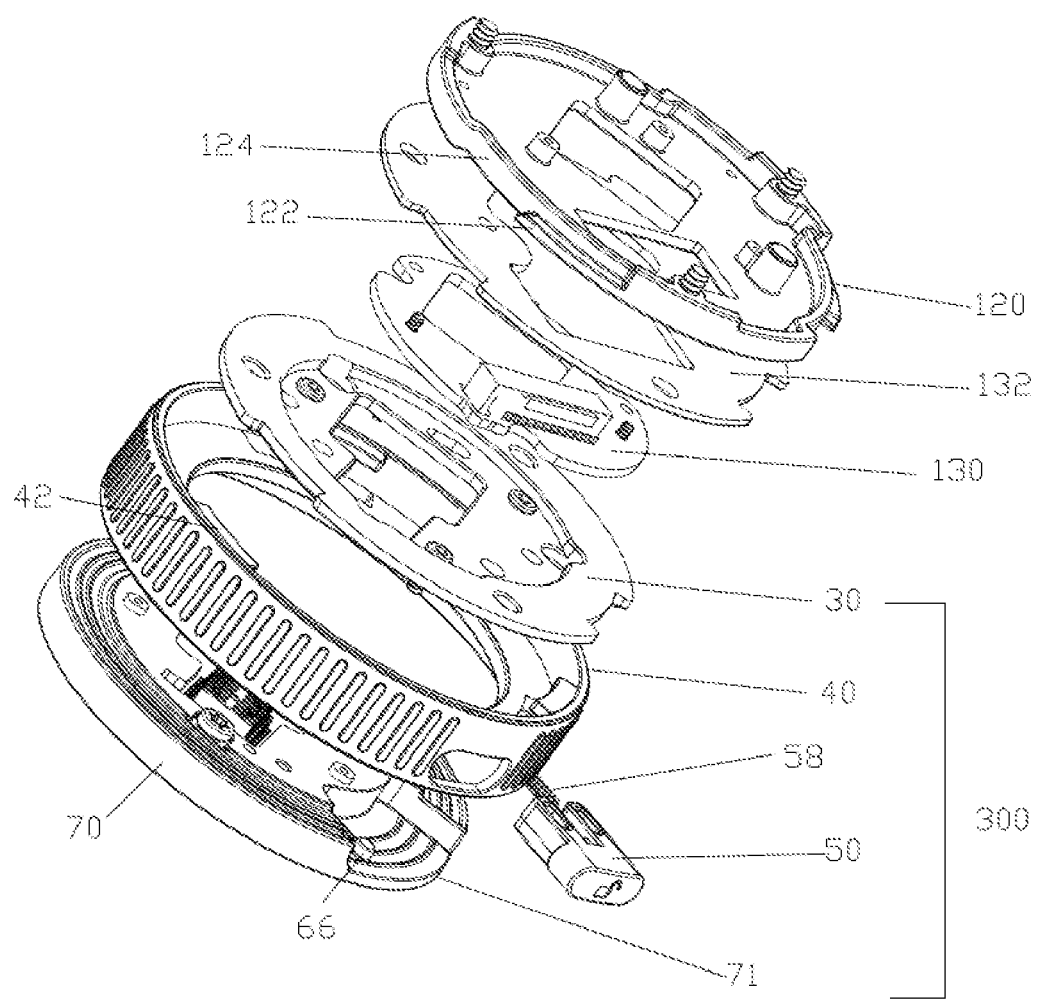
FIG. 3 is a three-dimensional exploded view of a connection apparatus of a detachable gimbal according to an implementation of the present application.
Figure 4:
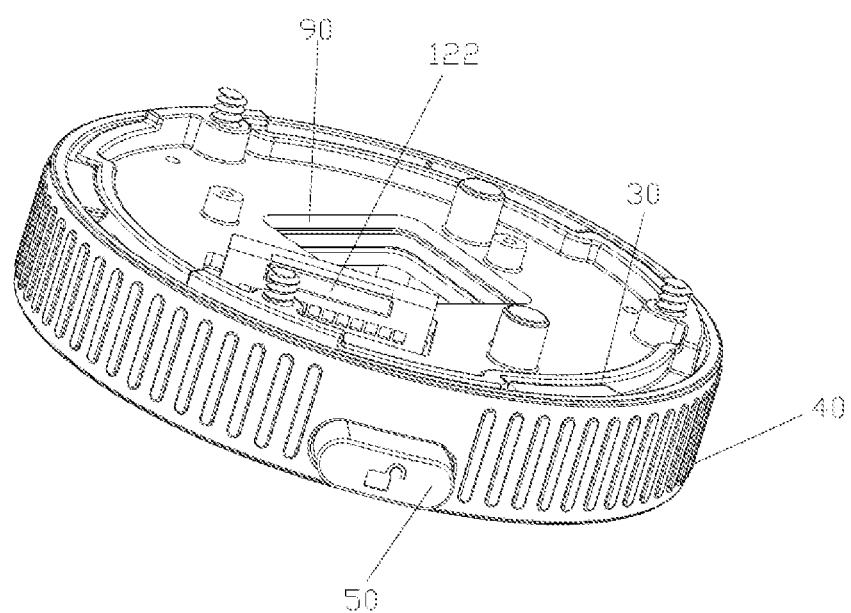
FIG. 4 is a three-dimensional assembly view of a connection apparatus of a detachable gimbal according to an implementation of the present application.

Referring to FIG. 2 and FIG. 3 together, the unmanned aerial vehicle 100 includes a fuselage 110, a propeller 102 and a propeller 104 installed on the fuselage 110, a circuit connection terminal of the unmanned aerial vehicle, a gimbal 200, a connection apparatus 300 configured to detachably connect the unmanned aerial vehicle and the gimbal and a circuit connection terminal of the gimbal.

The unmanned aerial vehicle 100 in this embodiment is a quadrotor unmanned aerial vehicle. Four small and exquisite propellers are adopted for the unmanned aerial vehicle, which has features such as safe flight and flexible control and can implement flight with six degrees of freedom.

To fixedly install the gimbal connection apparatus 300, the fuselage 110 is mounted with a fuselage connection plate 120 and the fuselage connection plate 120 includes an alignment slot 124 and a buckle edge 122 matched with a pre-fixed apparatus. The buckle edge 122 has a specified inclination angle. In this embodiment of the present application, the fuselage connection plate 120 is provided with three pairs of alignment slots 124 and buckle edges 122.

To reduce the impact of vibration generated by the unmanned aerial vehicle during the take-off and landing, the fuselage connection plate 120 is fixedly provided with a buffer layer 132. In this embodiment of the present application, the buffer layer 132 is a silica gel layer, or an elastic material layer with a buffer effect. The buffer layer 132 is clamped on the fuselage connection plate 120 by using a buffer fixing plate 130.

The buffer layer may also be implemented in another manner. For example, the buffer layer is fixed on the gimbal connection apparatus 300 of the gimbal 200 and it only needs to ensure that the gimbal 200 and the fuselage 110 are stably fastened after the gimbal and the fuselage are assembled.

For the specific structure of the gimbal connection apparatus 300, refer to FIG. 3. The gimbal connection apparatus 300 includes an alignment component, a pre-installed component disposed on the alignment component and a locking component. The alignment component is fixed on the gimbal 200 and is configured to align the circuit connection terminal of the unmanned aerial vehicle with the circuit connection terminal of the gimbal. The pre-installed component disposed on the alignment component moves relative to the alignment component to fixedly connect the gimbal to the fuselage connection plate 120 of the fuselage 110. The locking component disposed on the pre-installed component locks the pre-installed component when the pre-installed component moves relative to the alignment component to a preset location.

The alignment component includes a gimbal connection plate 70 fixed on the gimbal 200 and a fixing cover 30 fixed on the gimbal connection plate 70 and at least one slideway is formed between the gimbal connection plate and the fixing cover. In this implementation, three slideways are formed. One side of the gimbal connection plate 70 that is faced to the fixing cover 30 is provided with several round friction ribs 73.

The pre-installed component is a rotating ring 40. The rotating ring 40 may be rotatably installed in the slideway formed between the gimbal connection plate 70 and the fixing cover 30 and is rotatable relative to the gimbal connection plate 70 and the fixing cover 30. Three fasteners 42 are formed in the inner wall of the rotating ring 40 to correspond to three pairs of alignment slots 124 and buckle edges 122 disposed in the fuselage connection plate 120. When the rotating ring 40 is rotatably installed between the gimbal connection plate 70 and the fixing cover 30, the three fasteners 42 are located in the corresponding three slideways. When the rotating ring 40 is rotated, a plurality of fasteners 42 slides in the slideways with the rotating ring 40.

To accurately align the fuselage connection plate 120 of the unmanned aerial vehicle 10 with both the circuit connection terminal of the unmanned aerial vehicle and the circuit connection terminal of the gimbal, the rotating ring 40 and the fuselage connection plate 120 are provided with a pair of alignment identifiers.

When the alignment identifier of the rotating ring 40 is aligned with the alignment identifier of the fuselage connection plate 120, the circuit connection terminal of the unmanned aerial vehicle is accurately aligned with the circuit connection terminal of the gimbal.

The three pairs of alignment slots 124 and buckle edges 122 disposed on the fuselage 110 correspond to the three fasteners 42 disposed on the rotating ring 40.

After the gimbal 200 and the fuselage 110 are aligned completely, a pre-fixing process is entered. After the alignment is completed, the fastener 42 of the rotating ring 40 is partially stretched into the alignment slot 124 of the fuselage connection plate 120. The rotating ring 40 is rotated, so that the a plurality of fasteners 42 inside the rotating ring 40 slides in the slideways and the fastener 42 climbs up to the buckle edge 122 at one side of the alignment slot 124 from the alignment slot 124. An inclination angle specified on a contact surface of the buckle edge 122 and the fastener 42 ensures that after a rotating stroke of the fastener 42 in the slideway ends, the fastener 42 is just fastened on the buckle edge 122 of the fuselage connection plate 120.

Figure 6:
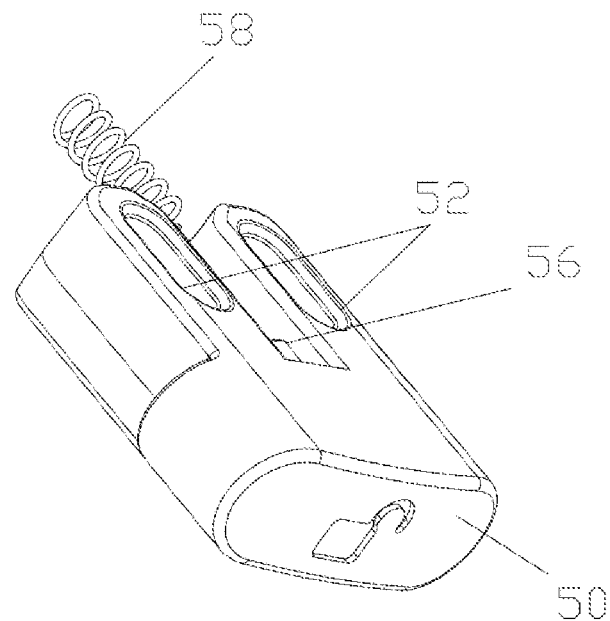
FIG. 6 is a three-dimensional structural view of a button of a locking component of a connection apparatus of a detachable gimbal according to an implementation of the present application.
Figure 7:
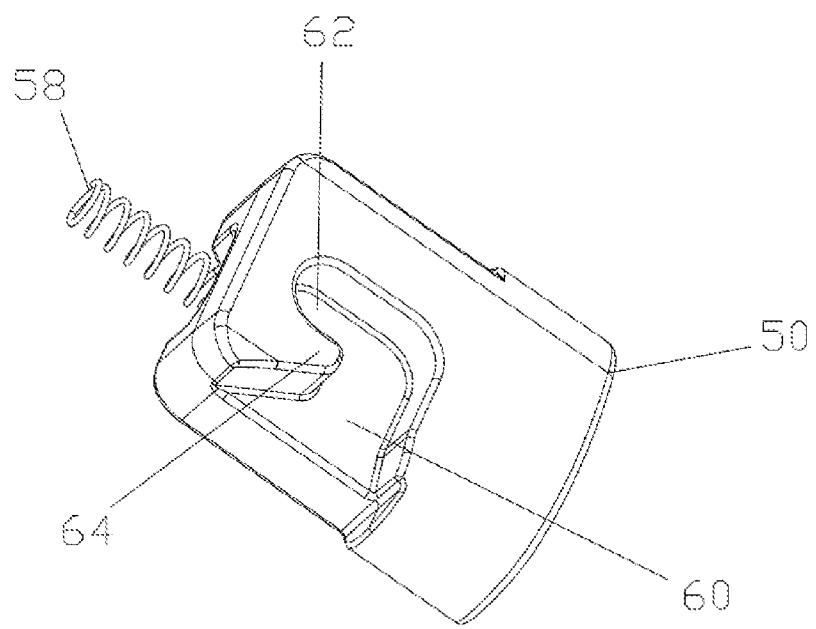
FIG. 7 is a three-dimensional structural view of a button of a locking component of a connection apparatus of a detachable gimbal at another viewing angle according to an implementation of the present application.

Referring to FIG. 6 and FIG. 7, the locking component is disposed in the rotating ring 40 and includes a disconnect button 50, a spring 58, a stroke control structure and a locking structure.

The gimbal connection plate 70 is provided with an installation slot 71 for installing the locking component. The disconnect button 50 of the locking component is provided with an installation shaft 56 and the spring 58 is sleeved over the installation shaft 56 and has an end abutted in the installation slot 71. The stroke of the disconnect button 50 elastically disposed in the installation slot 71 is limited by the control structure. The stroke control structure includes two guide slots 52 formed at one side of the disconnect button 50 and two limiting columns (not shown) disposed in the installation slot 71. The locking structure includes a guide slot 60 formed at the other side of the disconnect button and a buckle 64 protruded from the disconnect button 50. An end of the guide slot 60 is roundabout to form an accommodating cavity 62 and an inlet of the guide slot 60 is a trumpet-shaped wide mouth.

Referring to the gimbal connection apparatus 300 shown in FIG. 2, a fixed link 66 is further disposed in the installation slot 71 of the gimbal connection plate 70.

After the locking component is installed in the installation slot 71, the fixed link 66 in the installation slot 71 is just located at the trumpet-shaped inlet of the guide slot 60. Before the fastener 42 of the rotating ring 40 completes the stroke at the buckle edge 122, the fixed link 66 is away from the trumpet-shaped inlet of the guide slot 60 by a certain distance. When a fastening stroke of the fastener 42 at the buckle edge 122 reaches a pre-determined location, the fixed link 66 enters the trumpet-shaped inlet of the guide slot 60. In the process of completing the fastening stroke of the fastener 42 at the buckle edge 122, the fixed link 66 gets over the buckle 64 from the trumpet-shaped inlet of the guide slot 60 to enter the accommodating cavity 62 and is limited in the accommodating cavity 62 when being blocked by the buckle 64.

In this embodiment of the present application, the gimbal connection plate 70 that is faced to the fixing cover 30 is provided with several friction ribs 73.

The friction ribs 73 are disposed to increase a friction force generated when the rotating ring 40 is rotated, so that the rotating ring 40 feels more stable when being rotated and the rotating ring is prevented from turning back to affect the pre-fixing step completed by the operation.

Figure 5:
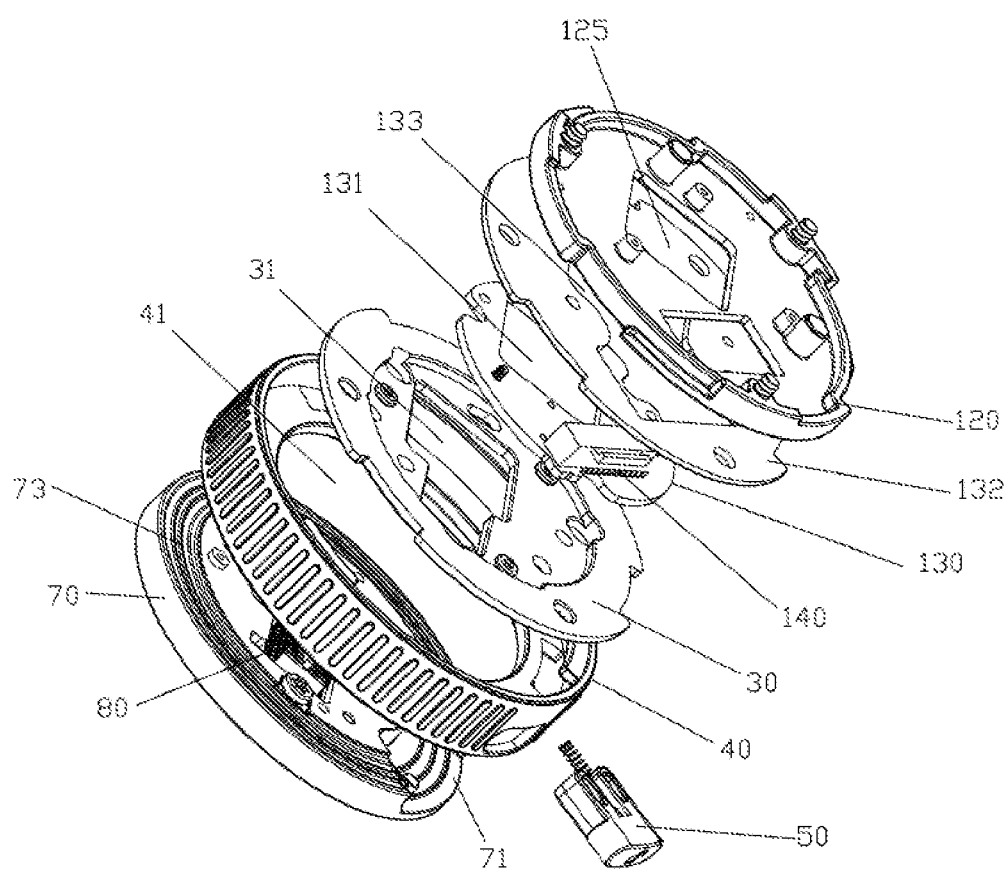
FIG. 5 is another three-dimensional assembly view of a connection apparatus of a detachable gimbal according to an implementation of the present application.

Referring to FIG. 5, the gimbal connection apparatus of the present application is entirely hollow to form an air guide cavity. In a working process of the unmanned aerial vehicle, heat may be generated between the circuit connection terminal of the unmanned aerial vehicle and the circuit connection terminal of the gimbal and the accumulated heat affects the product performance. In this embodiment of the present application, one end of the air guide cavity is provided with a fan and an adsorption force is generated inside the fuselage 110 of the unmanned aerial vehicle and the gimbal 200 from the bottom to top. The detachable gimbal of the present application fully uses the air adsorption force, to form a cooling air duct in the gimbal connection apparatus and extract the heat generated in the gimbal, thereby optimizing the circuit work environment and improving the service life of the gimbal and the unmanned aerial vehicle.

The structure of the cooling air duct is formed as follows: The fixing cover 30 is provided with an opening 31, the buffer layer 132 is provided with an opening 133, the buffer fixing plate 130 is provided with an opening 131 and the fuselage connection plate 120 is provided with an opening 125. An opening 41 is formed at the center of the rotating ring 40. The openings jointly form a cooling air duct for an unmanned aerial vehicle circuit and a gimbal circuit together with the opening 41 of the rotating ring 40. The cooling air duct starts from the periphery of the rotating ring 40, passes through the opening 41 of the rotating ring 40, the opening 31 of the fixing cover 30, the opening 131 of the buffer fixing plate 130 and the opening 133 of the buffer layer 132 and scatters all around the opening 125 of the fuselage connection plate 120.

During installation, according to the alignment identifiers disposed on the rotating ring 40 and the fuselage connection plate 120, the gimbal assembled with the gimbal connection apparatus 300 is aligned with the fuselage connection plate 120 installed at the lower side of the fuselage 110, so that the circuit connection terminal of the unmanned aerial vehicle is aligned with the circuit connection terminal of the gimbal, to complete the alignment step. After the alignment, the fastener 42 of the rotating ring 40 is partially stretched into the alignment slot 124 of the fuselage connection plate 120. The pre-fixing step is started and the rotating ring 40 is rotated, so that a plurality of fasteners 42 inside the rotating ring 40 slides in the slideways and the fastener 42 climbs up to the buckle edge 122 at one side of the alignment slot 124 from the alignment slot 124. An inclination angle specified on a contact surface of the buckle edge 122 and the fastener 42 ensures that after a rotating stroke of the fastener 42 in the slideway ends, the fastener 42 is just fastened on the buckle edge 122 of the fuselage connection plate 120. In the process of the pre-fixing step, when the buckle edge 122 of the fastener 42 slides to a fastening location, the locking component loosens the fixing between the fastener 42 and the buckle edge 122 to prevent the rotating ring 40 from receding and the fixed link 66 slides into the accommodating cavity 62 of the guide slot 60 of the disconnect button, to lock the fastening between the gimbal and the fuselage. Specifically, when the fastener 42 is rotated to a predetermined location on the contact surface of the buckle edge 122, the fixed link 66 enters the trumpet-shaped inlet of the guide slot 60 and as the fastener 42 is further rotated on the buckle edge 122, the fixed link 66 gets over the buckle 64 from the trumpet-shaped inlet of the guide slot 60 to enter the accommodating cavity 62 and is limited in the accommodating cavity 62 when being blocked by the buckle 64. Meanwhile, the end of the spring on the disconnect button 58 of the locking component is tightly abutted between the inner wall of the installation slot 71 and the disconnect button, to lock the rotating ring 40 and the gimbal 200 by using an elastic force of the spring.

During disassembly, only one h and is needed to press the disconnect button 50 and the other h and may hold the gimbal 200 to rotate by a certain angle to directly pull out the gimbal 200. Specifically, when the disconnect button 50 is pressed, the disconnect button 50 moving inside compresses the spring, the fixed link 66 is separated from the accommodating cavity 62, the rotating ring 40 is rotated and the fixed link 66 gets over the buckle 64 to drop out from the trumpet-shaped inlet. Meanwhile, the three fasteners 42 of the rotating ring 40 also return to the alignment slot 124 from the buckle edge 122. In this case, the gimbal is disassembled completely.

In the gimbal connection apparatus, the detachable gimbal and the unmanned aerial vehicle of the present application, the alignment component may preferentially ensure the electrical connection of circuit connection terminals between the unmanned aerial vehicle and the gimbal, so that the circuit connection terminals between the unmanned aerial vehicle and the gimbal only need to maintain the electrical contact to avoid repeated friction during disassembly, to reduce the mechanical loss of the circuit connection terminals and improve the service life of the unmanned aerial vehicle. The pre-installed component and the locking component are convenient and easy to operate and the gimbal can be fixed and disassembled by performing a simple rotating operation or a pressing and rotating operation. Meanwhile, the gimbal connection plate 70 is provided with several friction ribs 73, which feel more delicate when a user operates the rotating ring 40. In the detachable gimbal of the present application, the fixing cover 30 or the fuselage connection plate 110 is provided with a buffer layer, to reduce the impact of vibration of the unmanned aerial vehicle on a circuit and a device during the take-off and landing. In the further improvement, the gimbal connection apparatus 300 is entirely hollow to form an air guide cavity, to prevent the heat generated between the circuit connection terminal of the unmanned aerial vehicle and the circuit connection terminal of the gimbal from being accumulated to affect the product performance. In the present application, a cooling air duct is formed in the gimbal connection apparatus and a fan is disposed, to extract heat generated by a gimbal circuit, thereby optimizing the circuit work environment and improving the service life of the gimbal and the unmanned aerial vehicle.

The foregoing descriptions are only implementations of the present invention and are not intended to limit the patent scope of the present invention. Equivalent structures or equivalent procedure changes made by using the specification and the accompanying drawings of the present invention, or direct or indirect application to other related technical fields are similarly included in the patent protection scope of the present invention.

What is claimed is:

1. A connection apparatus of a detachable gimbal, comprising:
   an alignment component, wherein the alignment component is configured to align a circuit connection terminal of an unmanned aerial vehicle with a circuit connection terminal of a gimbal;
   a pre-installed component disposed on the alignment component, wherein the pre-installed component moves relative to the alignment component to fixedly connect the gimbal to a fuselage of the unmanned aerial vehicle; and
   a locking component disposed on the pre-installed component, wherein the locking component locks the pre-installed component when the pre-installed component moves relative to the alignment component to a preset location;
   wherein the alignment component comprises a gimbal connection plate fixed on the gimbal and a fixing cover fixed on the gimbal connection plate and at least one slideway is formed between the gimbal connection plate and the fixing cover.

2. The connection apparatus of a detachable gimbal according to claim 1, wherein the gimbal connection plate is provided with several friction ribs.

3. The connection apparatus of a detachable gimbal according to claim 2, wherein the pre-installed component comprises a rotating ring that is installed in the at least one slideway and that is rotatable relative to the gimbal connection plate and the fixing cover, the rotating ring corresponds to the slideway and is provided with at least one fastener that may be fastened on the fuselage of the unmanned aerial vehicle and the rotating ring is provided with an alignment identifier.

4. The connection apparatus of a detachable gimbal according to claim 3, wherein the rotating ring is provided with an installation slot for installing the locking component, the locking component comprises a disconnect button assembled in the installation slot by using a spring and a stroke control structure and a locking structure of the disconnect button, the stroke control structure comprises two guide slots formed at one side of the disconnect button and two limiting columns disposed in the installation slot and the locking structure comprises a guide slot and a buckle formed at the other side of the disconnect button.

5. The connection apparatus of a detachable gimbal according to claim 1, wherein the fixing cover is provided with a buffer layer.

6. The connection apparatus of a detachable gimbal according to claim 2, wherein the fixing cover and the buffer layer is each provided with an opening and the openings jointly form a cooling air duct for an unmanned aerial vehicle circuit and a gimbal circuit together with an opening of the rotating ring.

7. An unmanned aerial vehicle, comprising a fuselage, a circuit connection terminal of the unmanned aerial vehicle, a gimbal and a circuit connection terminal of the gimbal and comprising a gimbal connection apparatus for detachably connecting the unmanned aerial vehicle to the gimbal, wherein the gimbal connection apparatus comprises:
an alignment component, wherein the alignment component is fixed on the gimbal and is configured to align the circuit connection terminal of the unmanned aerial vehicle with the circuit connection terminal of the gimbal;
a pre-installed component disposed on the alignment component, wherein the pre-installed component moves relative to the alignment component to fixedly connect the gimbal to the fuselage; and
a locking component disposed on the pre-installed component, wherein the locking component locks the pre-installed component when the pre-installed component moves relative to the alignment component to a preset location;
wherein the alignment component comprises a gimbal connection plate fixed on the gimbal and a fixing cover fixed on the gimbal connection plate and at least one slideway is formed between the gimbal connection plate and the fixing cover.

8. The unmanned aerial vehicle according to claim 7, wherein the gimbal connection plate is provided with several friction ribs.

9. The unmanned aerial vehicle according to claim 7, wherein the fixing cover is provided with a buffer layer.

10. The unmanned aerial vehicle according to claim 8, wherein the pre-installed component comprises a rotating ring that is installed in the at least one slideway and that is rotatable relative to the gimbal connection plate and the fixing cover, the rotating ring corresponds to the slideway and is provided with at least one fastener that may be fastened on the fuselage of the unmanned aerial vehicle and the rotating ring is provided with an alignment identifier.

11. The unmanned aerial vehicle according to claim 10, wherein the fuselage is mounted with a fuselage connection plate, the fuselage connection plate is provided with an alignment slot for guiding into the fastener and a buckle edge that matches the fastener and an inclination angle is specified on a contact surface of the buckle edge and the fastener.

12. The unmanned aerial vehicle according to claim 11, wherein the fuselage connection plate is fixedly provided with a buffer layer and the buffer layer is clamped on the fuselage connection plate by using a buffer fixing plate.

13. The unmanned aerial vehicle according to claim 12, wherein the rotating ring is provided with an installation slot for installing the locking component, the locking component comprises a disconnect button assembled in the installation slot by using a spring and a stroke control structure and a locking structure of the disconnect button, the stroke control structure comprises two guide slots formed at one side of the disconnect button and two limiting columns disposed in the installation slot and the locking structure comprises a guide slot and a buckle formed at the other side of the disconnect button.

14. The unmanned aerial vehicle according to claim 13, wherein the fixing cover, the buffer layer, the buffer fixing plate and the fuselage connection plate are each provided with an opening and the openings jointly form a cooling air duct for an unmanned aerial vehicle circuit and a gimbal circuit together with an opening of the rotating ring.

15. A detachable gimbal, comprising a gimbal connection apparatus configured to detachably connect an unmanned aerial vehicle to a gimbal, wherein the gimbal connection apparatus comprises:
an alignment component, wherein the alignment component is fixed on the gimbal and is configured to align a circuit connection terminal of the unmanned aerial vehicle with a circuit connection terminal of the gimbal;
a pre-installed component disposed on the alignment component, wherein the pre-installed component moves relative to the alignment component to fixedly connect the gimbal to a fuselage; and
a locking component disposed on the pre-installed component, wherein the locking component locks the pre-installed component when the pre-installed component moves relative to the alignment component to a preset location;
wherein the alignment component comprises a gimbal connection plate fixed on the gimbal and a fixing cover fixed on the gimbal connection plate and at least one sideway is formed between the gimbal connection plate and the fixing cover.

16. The detachable gimbal according to claim 15, wherein the pre-installed component comprises a rotating ring that is installed in the at least one slideway and that is rotatable relative to the gimbal connection plate and the fixing cover, the rotating ring corresponds to the slideway and is provided with at least one fastener that may be fastened on the fuselage of the unmanned aerial vehicle and the rotating ring is provided with an alignment identifier.

17. The detachable gimbal according to claim 15, wherein the fixing cover and the buffer layer are each provided with an opening and the openings jointly form a cooling air duct for an unmanned aerial vehicle circuit and a gimbal circuit together with an opening of the rotating ring.

* * * * *